E. S. FIELD.
Assignor, by mesne assignments, to THE NATIONAL WIRE MATTRESS COMPANY.
SPRING BED BOTTOM.
No. 9,920. Reissued Nov. 1, 1881.
Fig. A.
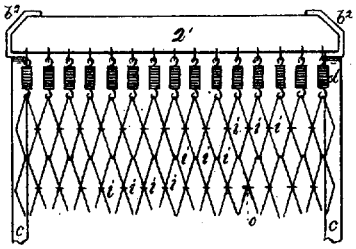
Fig. B.
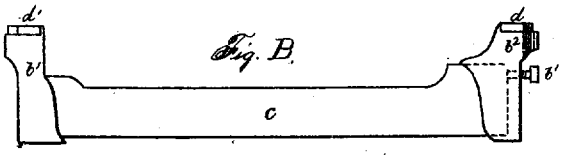
Fig. F. Fig. E. Fig. D. Fig. C.
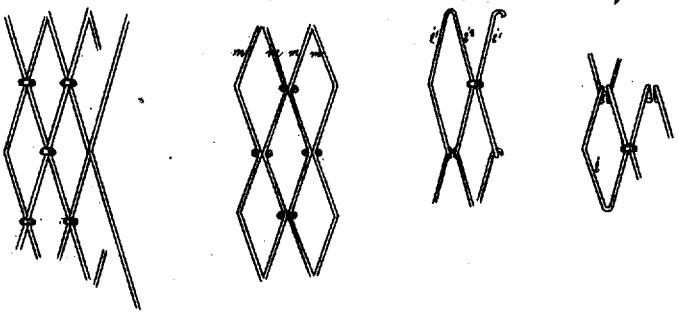
Witnesses.
John Edwards Jr.
Charles B. Mersham
Inventor.
Edwin S. Field.
By James Shepard
Atty
N. PETERS, Photo-Lithographer, Washington, D. C.

UNITED STATES PATENT OFFICE.

EDWIN S. FIELD, OF SPRINGFIELD, MASSACHUSETTS, ASSIGNOR, BY MESNE ASSIGNMENTS, TO THE NATIONAL WIRE MATTRESS COMPANY, OF NEW BRITAIN, CONNECTICUT.

SPRING BED-BOTTOM.

SPECIFICATION forming part of Reissued Letters Patent No. 9,920, dated November 1, 1881.

Original No. 138,491, dated May 6, 1873. Application for reissue filed August 29, 1881.

DIVISION B.

*To all whom it may concern:*

Be it known that I, EDWIN S. FIELD, of Springfield, in the county of Hampden and State of Massachusetts, have invented certain new and useful Improvements in Spring-Beds, of which the following is a specification, reference being had to the accompanying drawings.

I have for convenience' sake divided the invention in two divisions, A and B, that part thereof relating to certain methods of forming diamond-shaped figures described and claimed in this specification being included in this Division B.

The invention herein described relates to wire mattresses, and the special parts in which it particularly consists are found specified in the claim at the end of this specification.

In the drawings, Figure A is a top view of a part of the frame of a bed having one form of wire mattress attached thereto, the same showing such a frame and springs as are applicable to hang my improved fabric. Fig. B is a side view of such frame. Fig. C is a detached enlarged view of the wire links composed in Fig. A, showing one method of obtaining the diamond-shaped figures or meshes of the netting. Fig. D shows another method of forming the diamond-shaped figures. Fig. E shows another, and Fig. F shows still another.

The letter $a'$ indicates one of the two end rails or pieces of a bed-frame, their ends resting in corner-sockets $b^2$ $b^2$, attached to the ends of the side rails, $c$ $c$. To such end pieces are attached series of spiral springs, to the other end of which is attached the wire-netting composed of the diamond-shaped wire figures, connected at their obtuse angles by rings $o$. In Fig. D these diamond-shaped figures are composed of two pieces of wire, $i'$ $i^2$, each forming half of the figure, one end of such half, as at $x$, being hooked in toward its fellow, and the other end being hooked downward, so as to take into the next figure. In Fig. E these figures are shown as composed of two continuous wires, $m$ $m$, attached at the apexes of the diamond-shaped figures, as well as the obtuse angles, by rings. It will be seen that each one of these continuous wires has a zigzag form throughout its whole extent, the ends of the wires being suspended by the spiral springs. In Fig. F the figures are shown as composed of continuous wires; but each wire forms the corresponding side of two adjacent figures between the angles of the wire.

I do not claim a netting having connected and continuous diamond shaped figures, as such a netting is disclosed in Division A.

I claim as my invention—

In a bed-bottom composed of a wire-netting, connected and continuous zigzag wires suspended from the end rails by springs, substantially as described.

EDWIN S. FIELD.

Witnesses:

C. E. MITCHELL,

F. L. HUNGERFORD.